United States Patent [19]

Schwartz

[11] 4,305,180

[45] Dec. 15, 1981

[54] BAYONET COUPLING NUT

[75] Inventor: Lawrence Schwartz, Huntington Beach, Calif.

[73] Assignee: International Telephone and Telegraph Corporation, New York, N.Y.

[21] Appl. No.: 103,500

[22] Filed: Dec. 14, 1979

[51] Int. Cl.³ .......................... A47B 17/00; H01R 4/54
[52] U.S. Cl. ................................ 24/221 R; 339/90 R; 403/349
[58] Field of Search ........... 24/73 RM, 221 R, 221 A, 24/221 K; 85/5 P; 403/349; 339/88 R, 90 R, 90 C, 187, 188 R, 188 C, 188 T; 220/300

[56] References Cited

U.S. PATENT DOCUMENTS

| 1,514,314 | 11/1924 | Douglas | 339/188 R |
|---|---|---|---|
| 1,738,893 | 12/1929 | Grady | 24/221 R X |
| 1,785,211 | 12/1930 | Scofield | 339/188 T |
| 2,282,360 | 5/1942 | Horrocks | 24/221 A X |
| 2,437,180 | 3/1948 | Allen | 339/188 C X |
| 2,519,571 | 8/1950 | Henry | 24/221 A |
| 3,060,538 | 10/1962 | Simi | 24/221 A |
| 4,072,385 | 2/1978 | Wallner | 339/88 R |

FOREIGN PATENT DOCUMENTS

| 23991 | 10/1907 | United Kingdom | 339/188 R |
|---|---|---|---|
| 20580 | 7/1915 | United Kingdom | 339/188 R |
| 255572 | 7/1926 | United Kingdom | 339/188 R |
| 444211 | 3/1936 | United Kingdom | 339/188 R |
| 577508 | 5/1946 | United Kingdom | 339/188 R |
| 913501 | 12/1962 | United Kingdom | 339/188 R |

Primary Examiner—Thomas J. Holko
Attorney, Agent, or Firm—Thomas L. Peterson

[57] ABSTRACT

A bayonet coupling nut is disclosed in which a metal element having at least one bayonet slot formed therein is mounted within a cylindrical nut body. The body may be formed of metal or plastic, and the bayonet slot-forming element is formed from a stamped sheet metal strip or a suitably formed wire. The element is inherently resilient, thus eliminating the need for a separate wave spring as in prior bayonet coupling nuts.

13 Claims, 10 Drawing Figures

4,305,180

BAYONET COUPLING NUT

BACKGROUND OF THE INVENTION

The present invention relates to a bayonet coupling nut and, more specifically, to a bayonet coupling nut suitable for electrical connectors.

The use of bayonet coupling arrangements in the electrical connector art is well known. Typically, a bayonet coupling nut is rotatably mounted on the shell of the plug connector member. The nut has bayonet grooves formed in its interior surface opening to the front of the nut. When the plug connector member is mated with the receptacle connector member of the assembly, bayonet pins on the receptacle shell enter the bayonet slots on the nut. Rotation of the nut draws the plug and connector members together into mating relationship.

The bayonet slots in the coupling nut may be formed by die casting the nut using a suitable material such as aluminum, or by machining the slots in the interior of the nut. Both techniques are relatively expensive. Also, the standard bayonet coupling nut requires a wave spring and friction ring for exerting a rearwardly directed biasing force on the nut which maintains the nut firmly coupled with the bayonet pins on the receptacle shell.

It is one object of the present invention to provide an improved bayonet coupling nut which is less expensive to manufacture and eliminates the need of a wave spring and friction ring as utilized in the prior art bayonet coupling arrangements.

Heretofore, bayonet coupling arrangements have been considered impractical for use on connectors having plastic shells because a plastic coupling nut and bayonet pin would not be sufficiently hard to withstand a large number of matings and unmatings of the connector parts. It is, therefore, another object of the present invention to provide a bayonet coupling device which is practical for use on plastic connectors.

SUMMARY OF THE INVENTION

According to a principal aspect of the present invention, there is provided a bayonet coupling nut comprising a nut body having a bore therethrough and at least one bayonet slot-forming element mounted on the wall of the bore. The element comprises a pair of spaced, generally parallel legs joined at one end by a bite defining a bayonet slot therein. The legs extend at an acute angle with respect to and said slot opens in the direction of the front of the body. The forward portions of the legs are fixed axially in the bore of the nut body. The rear portions of the legs are resilient and free to flex axially toward the front of the body when a bayonet pin is pushed into the slot.

Thus, the bayonet slot-forming element of the present invention provides through its resilient, flexible legs integral spring means which imparts resilience to the edges of the bayonet slot in the axial direction of the ring. Hence, there is no necessity for a separate wave spring and friction ring as in the prior art bayonet coupling arrangement. Furthermore, since the bayonet slot is formed in a separate element from the nut body, the body may be formed of a different material than the element, for example, plastic while the element is formed of resilient metal. The bayonet slot-forming element may be inexpensively manufactured by stamping from a sheet metal strip. Other objects and advantages of the invention will become more apparent from the following description taken in connection with the accompanying drawings.

DESCRIPTION OF THE PREFERRED EMBODIMENTS

Figure 1:
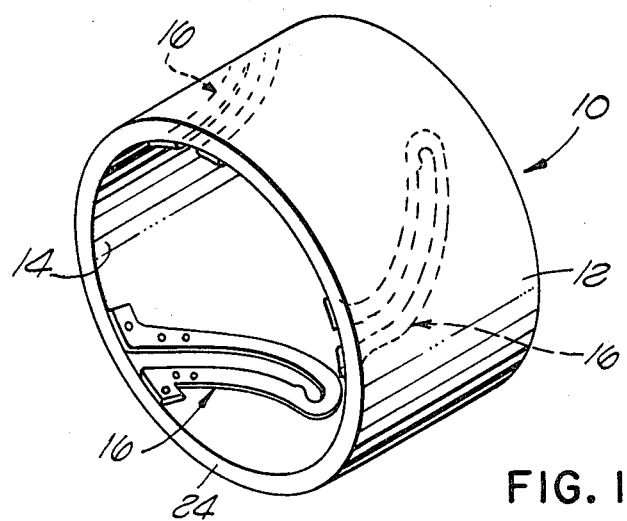
FIG. 1 is a perspective view of one embodiment of the coupling nut of the present invention in which the bayonet slots thereon are provided by a plurality of separate slot-forming elements mounted on the nut body.
Figure 2:
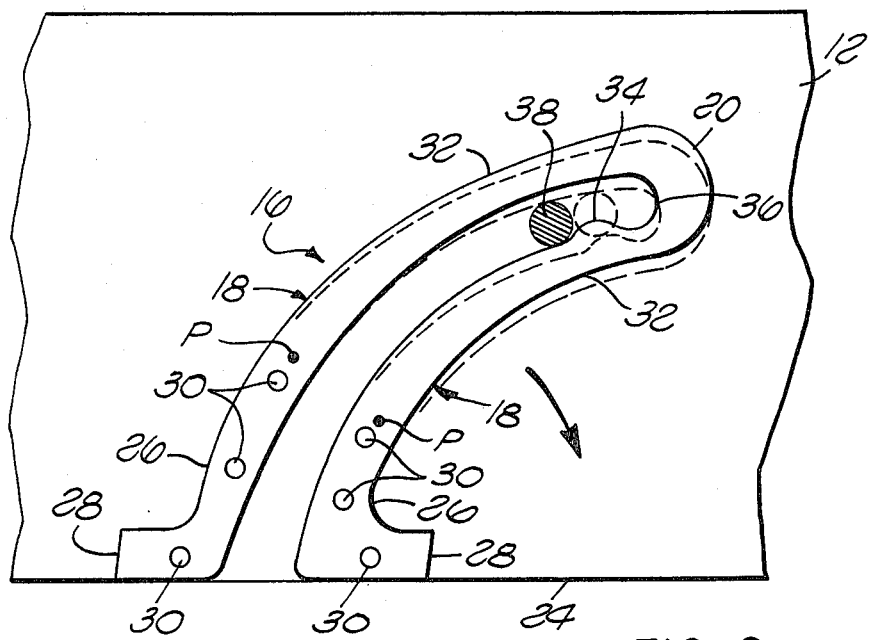
FIG. 2 is an enlarged fragmentary view showing one of the bayonet slot-forming elements on the inside surface of the coupling nut illustrated in FIG. 1.

Referring now to FIGS. 1 and 2 of the drawings in detail, one embodiment of the bayonet nut of the present invention, generally designated 10, comprises a cylindrical body 12 having a bore 14 extending therethrough in which there is mounted a plurality of bayonet slot-forming elements 16, three being shown by way of example only. Preferably the three elements 16 are spaced uniformly about the circumference of the body 12.

Preferably, each element 16 is stamped from resilient, flat sheet metal stock into the configuration seen in FIG. 2. A slight curvature is imparted to the stamping so that the element will conform to the cylindrical wall of the bore 14. The element 16 comprises a pair of spaced, generally parallel legs 18 joined at one end by a bite 20 defining a bayonet slot 22 therein. The element 16 is mounted on the wall of the bore 14 so that the legs 18 extend at an acute angle with respect to the front edge 24 of the nut body 12. Further, the element 16 is positioned so that the slot 22 therein opens at the front 24 of the body. The forward portions 26 of the legs are formed with outwardly extending flange sections 28 bordering the front edge 24 of the nut body. The forward portions 26 of the legs are fixed to the wall of the bore 14 in any suitable fashion, for example, by spot welding. If the nut body 12 is formed of plastic, the spot welding of the element 16 to the body may be achieved by providing a series of holes 30 in the forward portions 26 of the legs 18, and by applying heat and pressure to the element in the region of the holes to cause the plastic material therebelow to soften and extrude into the holes, with the extruded portions overlapping the exposed surface of the element 16 to form buttons to secure the element in place. Alternatively tabs, not shown, could be formed on the outsides of the forward portions 26 of the legs of element 16 and bent outwardly for press-fitting into slots in the wall of the bore 14. Obviously, the forward portions of the legs of the element 16 may be anchored to the wall of the bore 14 in many different fashions.

It will be appreciated that because only the forward portions 26 of the legs 18 of element 16 are secured to the nut body 12, the rear portions 32 of the legs, being formed of resilient metal, are free to flex axially.

The forward edge of the slot 22 is formed with a rearwardly extending curved projection 34 adjacent to but spaced from the bottom 36 of the slot as is conventional in a standard bayonet slot. When the coupling nut 10 of the present invention is connected with a mating coupling member, not shown, having a bayonet pin 38, the pin will enter the slot 22 and slide freely through the slot to a position adjacent to the projection 34, as seen in full lines in FIG. 2, when the nut 12 is rotated relative to the mating coupling member. Further rotation of the nut causes the rear portions 32 of the legs 18 to flex forwardly to the dotted line position illustrated in FIG. 2. During this flexing, the rear portions of the legs pivot essentially about the points P shown in FIG. 2. Final rotation of the coupling nut will cause the bayonet pin 38 to enter the bottom 36 of the slot 22 whereupon the rear portions 32 of the legs will return to the full line position illustrated in FIG. 2 thereby locking the two coupling members together.

From the foregoing, it will be appreciated that the bayonet slots 22 formed in the element 16 of the coupling nut 10 will function in similar manner to bayonet slots die cast or machined into the interior of a conventional bayonet coupling nut. However, in contrast to the conventional bayonet coupling nut which requires a wave spring and friction ring to impart axial resilience to the nut, and, therefore, to the connection between the nut and the bayonet pins on the mating coupling member, in the present invention, the necessary spring action is achieved by the inherent resilience of the elements 16 themselves. Thus, the resilient means for the coupling nut of the present invention is an integral part of the bayonet slot-forming elements 16.

Furthermore, since the bayonet slots are formed in separate elements 16 from the coupling nut body 12, the body may be formed of a material different from that of the elements. For example, the body 12 may be formed of plastic, rather than metal. Thus, by the present invention, a plastic connector may be provided with a bayonet coupling nut which is capable of withstanding a large number of matings and unmatings of the connector parts.

Figure 4:
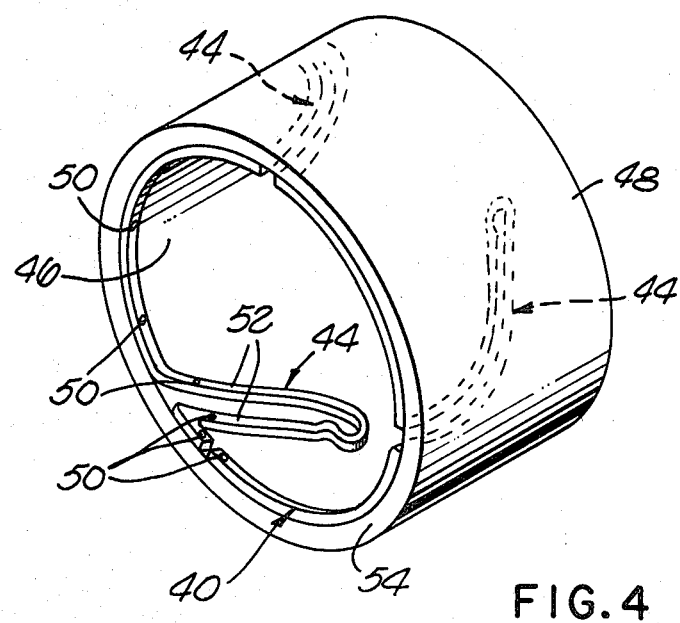
FIG. 4 is a perspective view of a second coupling nut embodying the element illustrated in FIG. 3 after the element has been formed into a cylindrical configuration.
Figure 3:
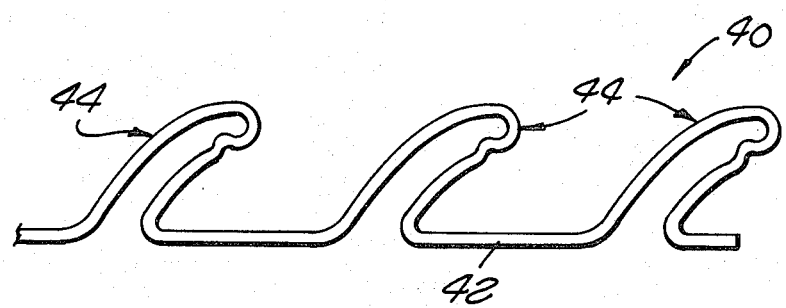
FIG. 3 is a top plan view of a wire shaped into a bayonet slot-forming element in accordance with a second embodiment of the invention.
Figure 5:
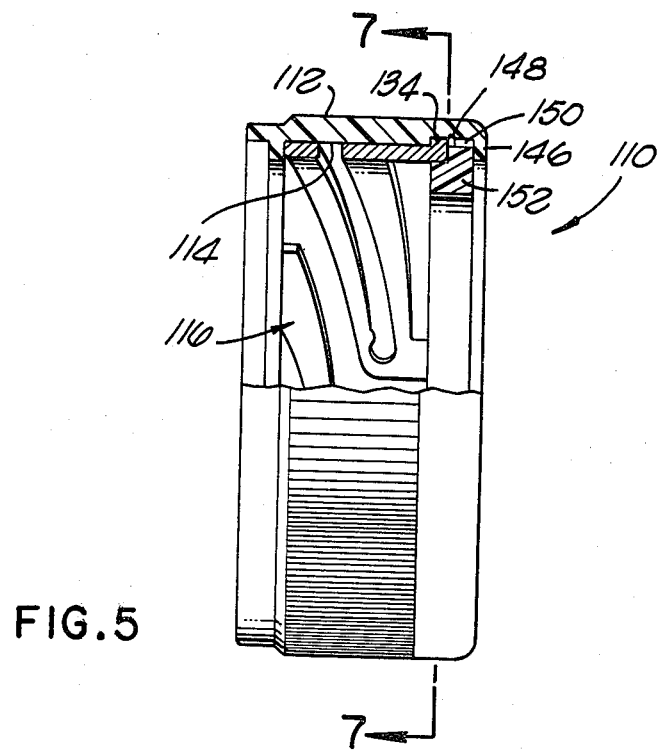
FIG. 5 is a partial longitudinal sectional view of a third embodiment of the bayonet coupling nut of the present invention incorporating a stamped bayonet ring.
Figure 6:
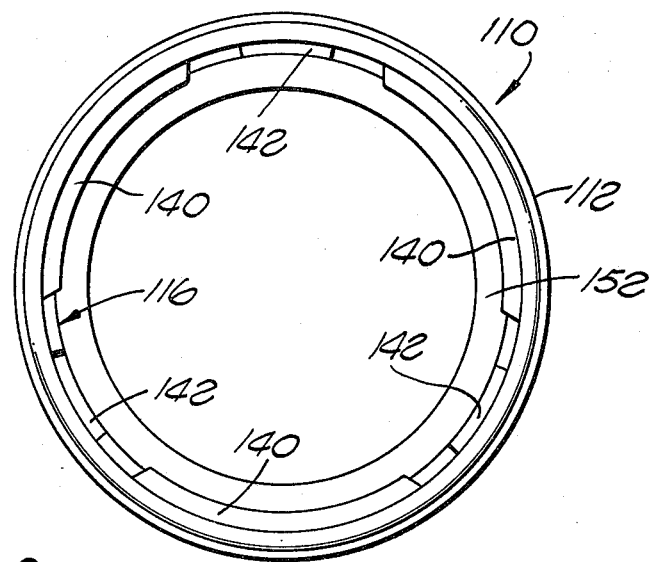
FIG. 6 is a front end view of the coupling nut illustrated in FIG. 5.

Reference is now made to FIGS. 3 and 4 of the drawings, which illustrate a second embodiment of the invention wherein the bayonet slot-forming element, generally designated 40, is constructed from a square cross-section wire 42, initially formed into the configuration illustrated in FIG. 3 embodying three bayonet slot-forming sections 44 each having a configuration similar to the element 16. Thus, the wire 42 provides a string of bayonet slot-forming elements. The element 40 is rolled into cylindrical form and mounted in a bore 46 of a coupling nut body 48. The element 40 may be secured against the wall of the bore 46 by spot welding, as indicated at points 50 in FIG. 4. The spot welding points 50 on the legs 52 of each section 44 are located close to the front edge 54 of the nut body so that the rear portions of the legs will be capable of flexing axially in the same manner as the legs in the elements 16 in the first embodiment of the invention described herein. Thus, it will be appreciated that the coupling nut illustrated in FIG. 4 will function in a similar fashion to the coupling nut 10. However, the bayonet slot-forming sections 44 are an integral part of a single wire-formed element 40 rather than separate parts requiring individual securement in the body of the coupling nut.

Reference is now made to FIGS. 5–10 of the drawings showing another embodiment of the bayonet coupling nut of the present invention, generally designated 110. The coupling nut 110 comprises a cylindrical plastic body 112 having a bore 114 extending therethrough in which there is coaxially mounted a bayonet ring, generally designated 116, which bears against the wall of the bore.

Figure 9:
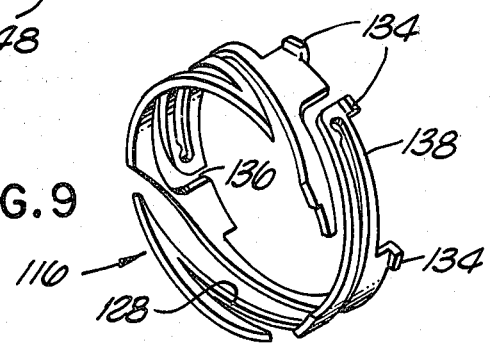
FIG. 9 is a perspective view of the bayonet ring employed in the coupling nut illustrated in FIG. 5; and, FIG. 10 is a top plan view of the sheet metal stamping from which the ring of FIG. 9 is formed.
Figure 10:
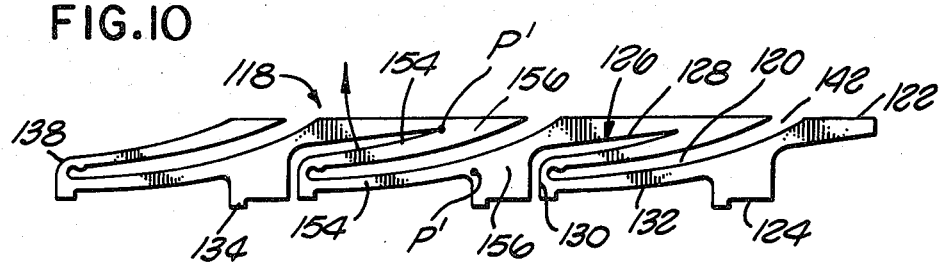

The bayonet ring 116 is in the form of a longitudinally split cylinder, as best seen in FIG. 9, that is formed from an elongated strip of resilient metal 118 shown in FIG. 10. The strip embodies three bayonet slots 120 which extend from the front edge 112 of the strip toward but short of the rear edge 124 thereof at an acute angle with respect to the edges. A second slot 126 is associated with each bayonet slot 120. Each second slot embodies a first region 128 which extends in substantially the same direction as the bayonet slot, and a second region 130 which extends transversely with respect to the edges 122 and 124, and, hence, axially when the strip is formed into a cylindrical ring. The second region 130 of each slot 126 opens at the rear edge 124 of the strip. The slot 126 imparts resilience to the strip in the direction transverse to the edges 122 and 124 or axially of the axis of the ring 116. Preferably, notches 132 are formed along the rear edge 124 of the strip behind the bayonet slots 120 to enhance the resilience of the ring. Four tabs 134 extend outwardly from the rear edge 124 of the strip. A recess 136 is formed in one end of the strip which receives the opposite end 138 thereof when the strip is formed into a cylinder or ring as illustrated in FIG. 9. Before the strip is so formed, however, the tabs 134 are bent so that they will extend radially outwardly from the body of the bayonet ring, as seen in FIG. 9.

The bayonet coupling nut body 112 is formed with three circumferentially spaced, arcuate, inwardly extending flanges 140 adjacent to the front of the body. The ring 116 is mounted in the body 112 so that the openings 142 of the bayonet slots 120 are positioned in the arcuate gaps between the flanges 140. The flanges restrict forward movement of the ring 116 in the body 112.

Figure 8:
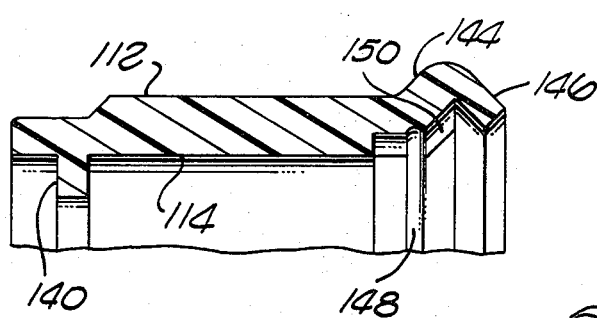
FIG. 8 is a fragmentary, longitudinal sectional view showing the configuration of the nut body before the bayonet ring is assembled therein.

As seen in FIG. 8, the rear end 144 of the body 112 of the coupling nut flares outwardly and terminates in an inwardly extending annular flange 146. A narrow annular groove 148 is formed in the inner surface of the body 112 where the rear end 144 thereof flares outwardly from the cylindrical bore 114. Four axially extending grooves 150 are formed in the inner wall of the flared rear end 144 of the body. The grooves 150 extend a short distance in front of the annular groove 148. The grooves 150 are spaced circumferentially about the nut body a distance corresponding to the spacing of the tabs 134 on the rear of the bayonet ring 116.

Figure 7:
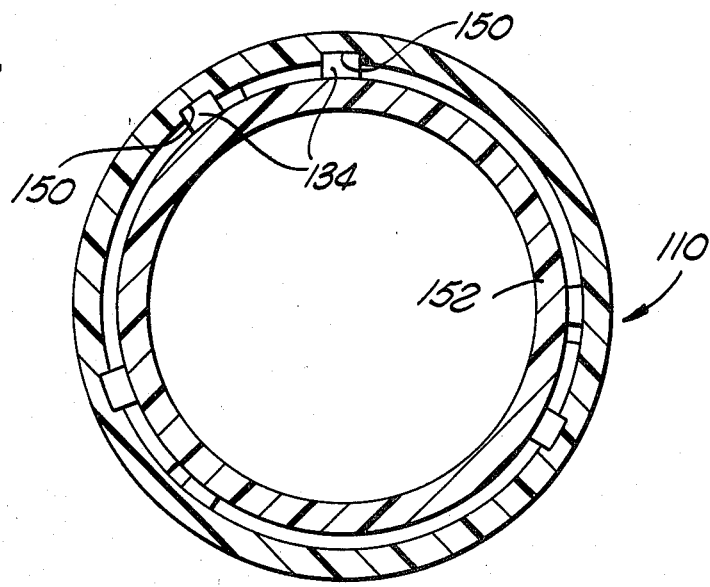
FIG. 7 is a transverse sectional view taken along line 7—7 of FIG. 5 showing how the bayonet ring is restrained from rotational movement in the nut body.

To assemble the ring 116 in the body 112 of the coupling nut, the ring is inserted into the rear of the bore 114 with the tabs 134 aligned with the grooves 150 in the body. As best seen in FIG. 7, the tabs and grooves are unsymmetrically located about the ring and nut body so that the ring may be mounted in the body in only one position, wherein the openings 142 of the bayonet slots are positioned in the gaps between the flanges 140 on the front of the body.

After the ring 116 is positioned against the flanges 140 at the front of the body 112 with the tabs 134 aligned with the grooves 150, an annular spacer 152 is positioned behind the ring. Thereafter, the flared rear end portion 144 of the body 140 is bent inwardly, by spinning or heat deformation, into the configuration illustrated in FIG. 5 wherein the flange 146 is positioned behind the spacer 152 thereby securely retaining the ring 116 within the bore 114 of the nut body. When the rear portion 144 of the body is bent inwardly, the tabs 134 will enter the grooves 150 thereby preventing rotational movement of the ring in the body.

It will be appreciated that the slots 120, 128 and 130 and the notches 132 in the ring 116 define resilient legs 154 similar to the legs 18 of the elements 16 illustrated in FIGS. 1 and 2. The forward portions 156 of the legs 154 are anchored in the coupling nut body by the mounting arrangement illustrated in FIGS. 5 to 7. The rear portions of the legs 154 are free to flex axially and, hence, pivot about the pivot points P' in the direction of the arrow illustrated in FIG. 10 when a bayonet pin is pushed into the slots 120 in similar fashion to the other embodiments of the invention disclosed herein.

What is claimed is:

1. An electrical connector bayonet coupling nut comprising:
    a generally cylindrical nut body having a bore extending from the front to the rear of said body;
    at least one bayonet slot-forming element mounted on the wall of said bore;
    said element comprising a pair of spaced, generally parallel legs joined at one end by a bight defining a bayonet slot therein;
    both said legs extending rearwardly at an acute angle with respect to said front of said body and said slot opening in the direction of said front of said body, said legs having an arcuate configuration conforming to the wall of said bore;
    the forward portions of said legs being fixed axially in said bore; and
    the rear portions of said legs being resilient and free to flex axially toward said front of said body when a bayonet pin is pushed into said slot.

2. A bayonet coupling nut as set forth in claim 1 wherein:
    a plurality of said elements are mounted on said wall of said bore.

3. A bayonet coupling nut as set forth in claim 2 wherein:
    said elements are joined to form a generally cylindrical ring coaxially mounted in said bore.

4. A bayonet coupling nut as set forth in claim 3 wherein:
    said ring is formed of a rectangular cross-section wire.

5. A bayonet coupling nut as set forth in claim 3 wherein:
    said ring is a stamped, resilient sheet metal part formed into a longitudinally split cylinder.

6. A bayonet coupling nut as set forth in claim 1 wherein:
    said body is formed of a material different than said nut body.

7. A bayonet coupling nut as set forth in claim 1 wherein:
    said body is formed of plastic; and
    said element is formed of resilient metal.

8. A bayonet coupling nut comprising:
    a nut body having a bore therethrough;
    a bayonet ring mounted coaxially within said bore having a forward edge and rear edge;
    said ring embodying a plurality of bayonet slots opening at said forward edge and integral spring means imparting resilience to the edges of said slots in the axial direction of said ring;
    said spring means comprising a second slot in said ring associated with each said bayonet slot; and
    each said second slot embodying a first region extending in substantially the same direction as its corresponding bayonet slot; and
    a second region opening at one of said edges of said ring.

9. A bayonet coupling nut as set forth in claim 8 wherein:
    each said second region extends in the axial direction and opens at said rear edge of said ring.

10. A bayonet coupling nut as set forth in claim 8, including:
    means preventing rotation of said ring in said bore.

11. A bayonet coupling nut as set forth in claim 8 wherein:
    the wall of said bore is formed with circumferentially spaced recesses therein; and
    said ring embodies a plurality of outwardly extending locking tabs adjacent to said rear edge each extending into one of said recesses to prevent rotational movement of said ring in said bore.

12. A bayonet coupling nut as set forth in claim 11 wherein:
    the rear of said body has an inwardly extending flange behind said tabs.

13. A bayonet coupling nut comprising:
    a nut body having a bore therethrough;
    a bayonet ring mounted coaxially within said bore having a forward edge and rear edge;
    said ring embodying a plurality of bayonet slots opening at said forward edge and integral spring means imparting resilience to the edges of said slots in the axial direction of said ring;
    said body being formed with a plurality of circumferentially spaced, arcuate, inwardly extending flanges in front of said forward edge of said ring for retaining said ring in said bore; and
    said ring being positioned in said bore so that the openings of said bayonet slots at said forward edge lie between said flanges.

* * * * *